United States Patent
Yan

(10) Patent No.: US 9,554,670 B2
(45) Date of Patent: Jan. 31, 2017

(54) WAFFLE-IRON TYPE COOKING APPARATUS FOR COOKING AND FORMING ROUNDED BUN SHAPED WAFFLES

(71) Applicant: Chi Yung Yan, Baltimore, MD (US)

(72) Inventor: Chi Yung Yan, Baltimore, MD (US)

( * ) Notice: Subject to any disclaimer, the term of this patent is extended or adjusted under 35 U.S.C. 154(b) by 0 days.

(21) Appl. No.: 14/984,306

(22) Filed: Dec. 30, 2015

(65) Prior Publication Data
US 2016/0183720 A1    Jun. 30, 2016

Related U.S. Application Data

(60) Provisional application No. 62/098,521, filed on Dec. 31, 2014.

(51) Int. Cl.
*A47J 37/06* (2006.01)

(52) U.S. Cl.
CPC .................................. *A47J 37/0611* (2013.01)

(58) Field of Classification Search
CPC .................................................. A47J 37/0611
USPC ........... 99/372, 374–378, 380–383; 219/385, 219/386, 524, 525
See application file for complete search history.

(56) References Cited

U.S. PATENT DOCUMENTS

| 1,854,244 | A | | 4/1932 | Rankin | |
|---|---|---|---|---|---|
| 5,253,565 | A | * | 10/1993 | Burton | A47J 37/0611 219/524 |
| 5,937,742 | A | * | 8/1999 | Steeb | A47J 37/0611 99/375 |
| 5,983,784 | A | * | 11/1999 | Goldberg | A47J 37/0611 99/372 |
| 6,130,411 | A | * | 10/2000 | Rockenfeller | H05B 3/00 219/386 |
| 6,555,795 | B2 | * | 4/2003 | Glucksman | A47J 37/0611 219/450.1 |
| D500,906 | S | | 1/2005 | Albritton et al. | |
| D532,182 | S | | 11/2006 | Hopkins et al. | |
| D570,157 | S | | 6/2008 | De La Torre et al. | |
| D648,594 | S | | 11/2011 | Bray | |
| 2005/0223907 | A1 | * | 10/2005 | Albritton | A47J 37/0611 99/372 |
| 2006/0249506 | A1 | * | 11/2006 | Robertson | A47J 37/0611 219/450.1 |
| 2008/0105137 | A1 | * | 5/2008 | Genslak | A47J 37/0611 99/350 |

FOREIGN PATENT DOCUMENTS

EP        1554959        7/2005

* cited by examiner

*Primary Examiner* — David Angwin
*Assistant Examiner* — Biniam Asmelash
(74) *Attorney, Agent, or Firm* — Whiteford, Taylor & Preston LLP; Peter J. Davis

(57) ABSTRACT

An apparatus for making waffles with customized shapes having a top plate with a top lid having a plurality of variable length protrusions in a shape that fits a round recess on the bottom plate. The apparatus can be used to make the top of a sandwich bun and/or the bottom of a sandwich bun in the same or different waffle irons. Variable shaped protrusions allow for even distribution of heat to a mixture for making shaped edible items.

8 Claims, 16 Drawing Sheets

WAFFLE-IRON TYPE COOKING APPARATUS FOR COOKING AND FORMING ROUNDED BUN SHAPED WAFFLES

BACKGROUND OF THE INVENTION

Field of the Invention

This invention relates primarily to an apparatus and a method to facilitate the preparation of a batter-type food customized waffle product. More particularly, the invention is directed to an apparatus for the manufacture of sandwich bun style shaped waffles.

Background

Waffle irons are well-known in the art. Typically, a waffle iron maintains a honeycomb pattern on both sides of the waffle. In some instances, a waffle iron is designed to change the profile shape of the waffle as shown, for example, in U.S. Pat. No. D570,157. Adjusting the profile shape of the waffle does not address the problem that the resulting waffles cannot be used effectively as a sandwich bun. The inherent shape of the waffle with its honeycomb pattern on both sides breaks apart under normal pressure from holding a sandwich during consumption. U.S. Pat. No. 5,983,784 creates a waffle with the honeycomb pattern on one side and a smooth flat profile on the opposite side. However, the design produces a thick waffle profile that creates a waffle with an undesirable thickness inconsistent with traditional waffles. In addition, the thick profile lengthens cook times in order to cook the batter thoroughly. This prevents the waffle from attaining proper texture and consistency and will burn the waffle exterior. Such design does not achieve the desired waffle product.

U.S. Pat. No. 1,854,244 attempts to address the stated problem. However the design produces an inner concave side that, while appropriate for use with a hotdog or sausage, is not appropriate for use with flat ingredients such as formed hamburger patties or chicken. The shaped waffle would collapse under slight hand pressure from holding the sandwich during consumption. Additionally, the design creates waffles with the honeycomb pattern on the outer convex side making it less comfortable to hold in a person's hands. In addition, the waffle irons of the prior art, typically comprise recessed cavities of uniform depth to create the waffle.

SUMMARY OF THE INVENTION

According to a preferred embodiment of the invention, there is provided a waffle iron comprising a top plate and a bottom plate, the top plate having a plurality of protrusions, and the bottom plate having a recess, said recess having a profile configured in a shape of a sandwich bun or roll; the plurality of protrusions having variable lengths, wherein ends of said protrusions form a profile that matches the profile of said recess, and wherein the plurality of variable length protrusions provide for even distribution of heat to a mixture for making shaped edible items.

According to a further embodiment of the invention, the top plate comprises a plurality of variable length protrusions for a bottom bun or roll shape and a plurality of variable length protrusions for a top bun or roll shape and the bottom plate comprises a bottom bun shaped recess and a top bun shaped recess. According to a preferred embodiment, the bottom plate recess having no protrusions, and has a generally smooth profile.

According to a further embodiment of the invention, the waffle iron has a top lid configured to receive said top plate and a base configured to receive said bottom plate wherein said top plate is configured for easy removal from said top lit for cleaning, and wherein said bottom plate is configured for easy removal from said base for cleaning.

According to a further embodiment of the invention, said top and bottom bun or roll shapes are in the shape of a hamburger bun.

According to a further embodiment of the invention, said top and bottom bun or roll shapes are in the shape of a hot dog bun.

According to a further embodiment of the invention, said top and bottom bun or roll shapes are in the shape of a sub roll.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF THE INVENTION

The invention summarized above and defined by the enumerated claims may be better understood by referring to the following description, which should be read in conjunction with the accompanying drawings in which like reference numbers are used for like parts. The description of various embodiments, set out below to enable one to build and use various implementations of the invention, is not intended to limit the invention, but is intended to serve as particular examples thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

This invention relates primarily to an apparatus used to facilitate the preparation of a batter-type food product into a type of waffle which due to its shape and construction will have several inherent advantages over any known similar pastry. A waffle is characterized by the fact that it results from the baking of a batter-type food product in a waffle-iron type cooking apparatus. More particularly, the invention is directed to make sandwich bun style shaped waffles used for the purposes of making sandwiches or hamburgers using any desired ingredients with the objective of making the waffle more comfortable to grasp and hold, and maintain its structural integrity during consumption, all while maintaining the desired lightness and texture preferred in waffles.

Figure 1:
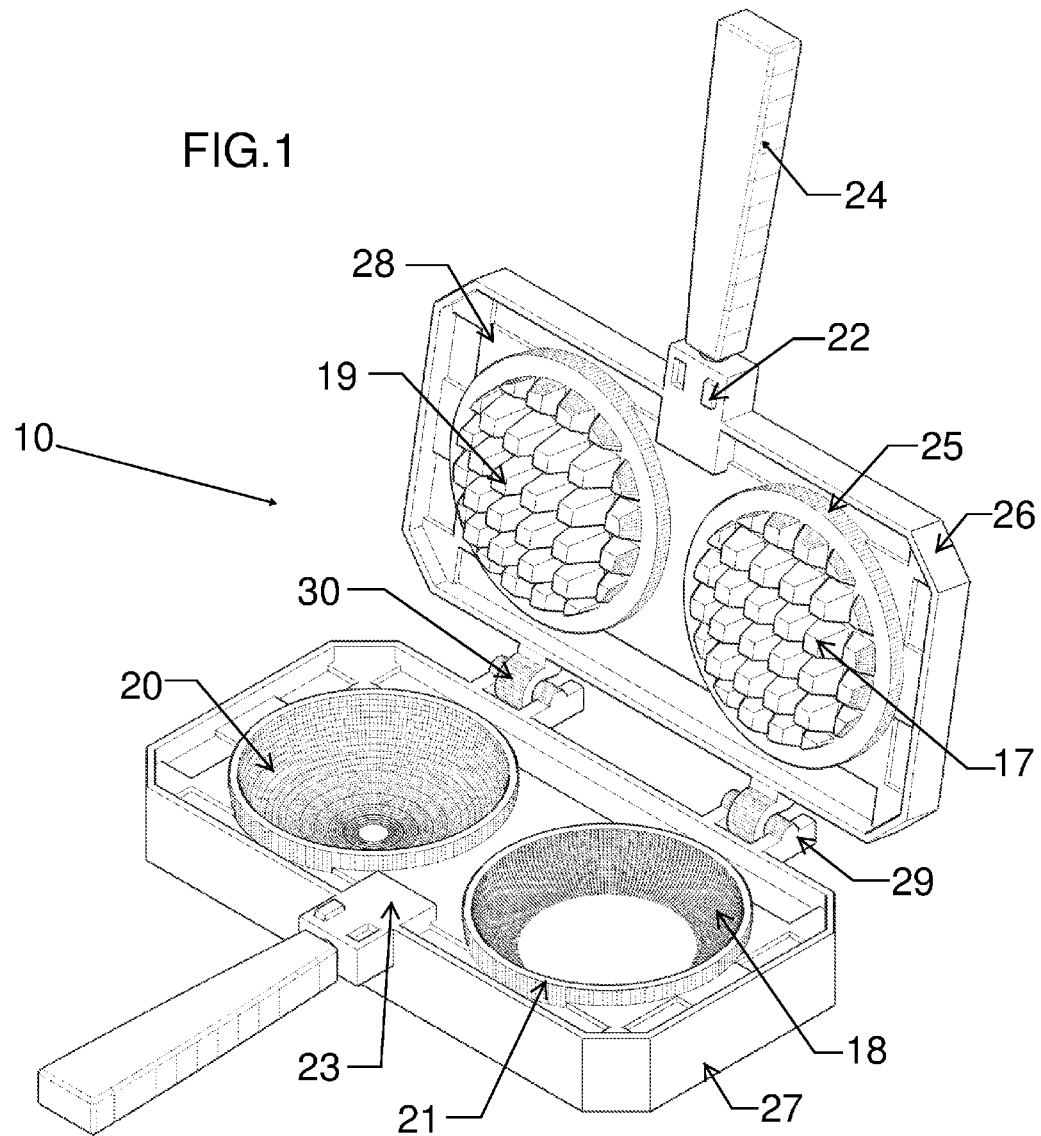
FIG. 1 is a top, front, right perspective view of an embodiment of the present invention necessitating a separate heat source.
Figure 2:
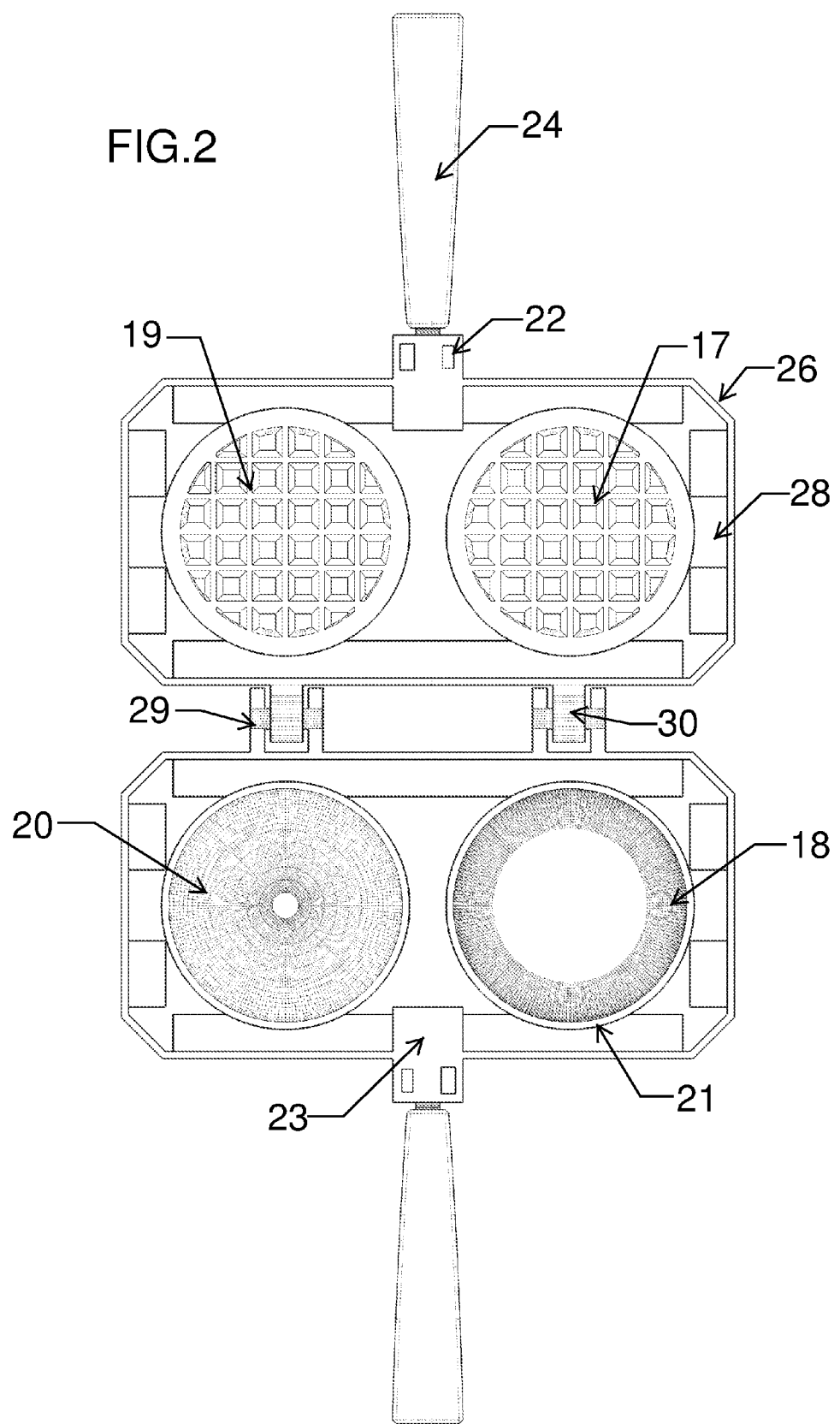
FIG. 2 is a top view of the embodiment shown in FIG. 1. shown in a fully open position.

Referring to FIG. 1, an apparatus for making waffles according to an embodiment of the invention has a top plate 26 and a bottom plate 27. The top plate 26 has a top lid 25 with a plurality of variable length protrusions 17 arranged in the form of a shape that fits a round recess 18 on the bottom plate 27. In some embodiments, the apparatus is designed to make the top of a sandwich bun as shown by the variable length protrusions for a top bun shape round recess 20 and variable length protrusions for top bun shape 19. In other embodiments, the apparatus is designed to make the bottom of a sandwich bun as shown by the variable length protrusions for a bottom bun shape 17 and the bottom bun shaped round recess 18. In the embodiments shown below they are combined in the same waffle iron. The variable length protrusions allow for even distribution of heat to a mixture for making shaped edible items, e.g., waffle mix.

Figure 3:
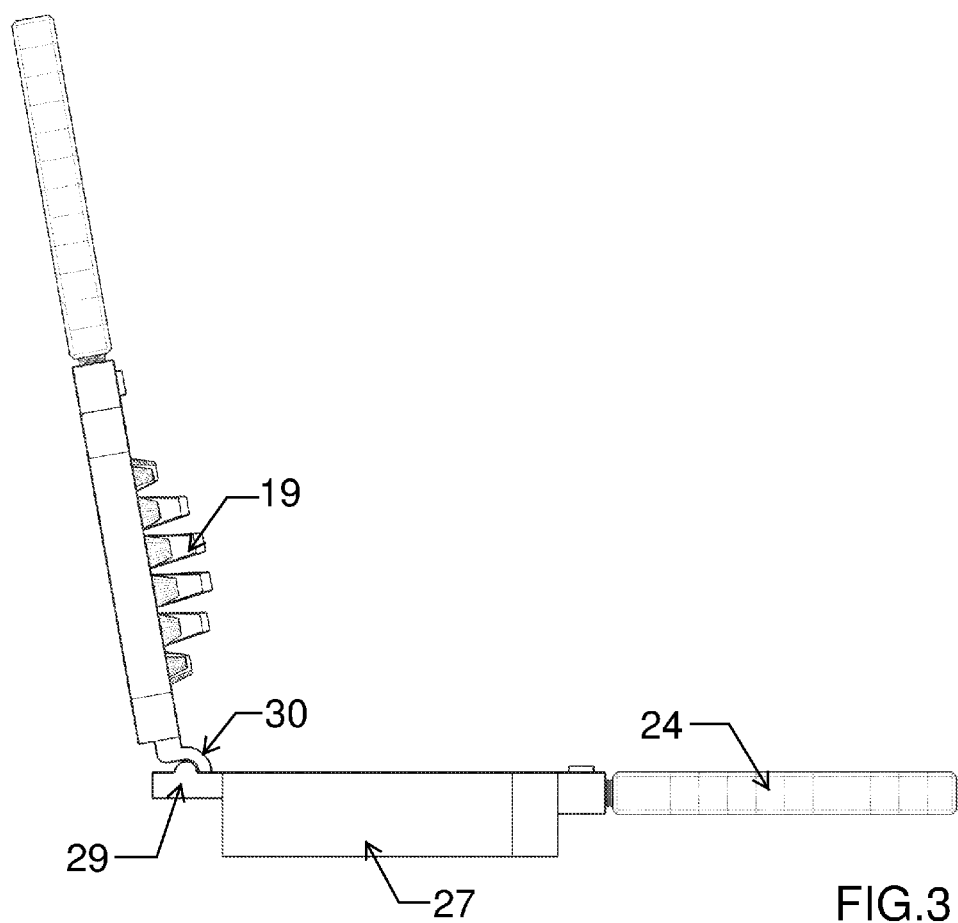
FIG. 3 is a left side view showing the profile of the embodiment of FIG. 1 showing also the design of the protrusions and indentations that form the waffle shape of the resultant waffle bun product.
Figure 4:
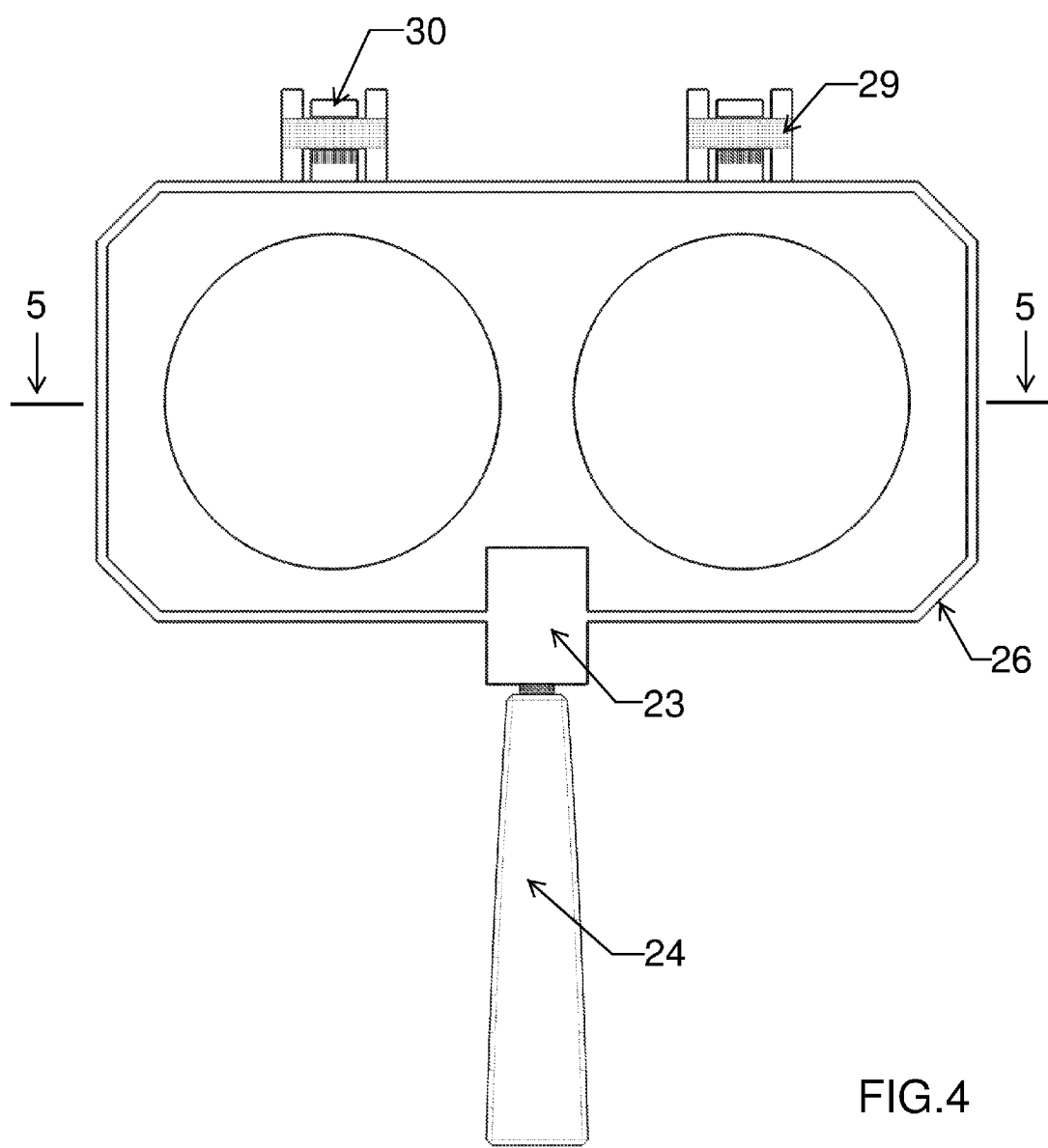
FIG. 4 is a top view of the embodiment of FIG. 1 in a fully closed position.
Figure 5:
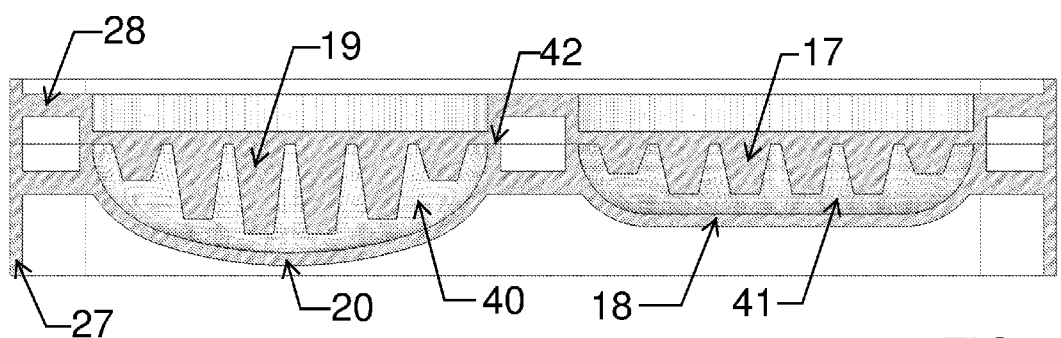
FIG. 5 is a side, sectional view, taken along the line 5-5 of FIG. 4 and showing the formation of the top and bottom bun shaped waffles by use of apparatus according to the present invention.
Figure 6:
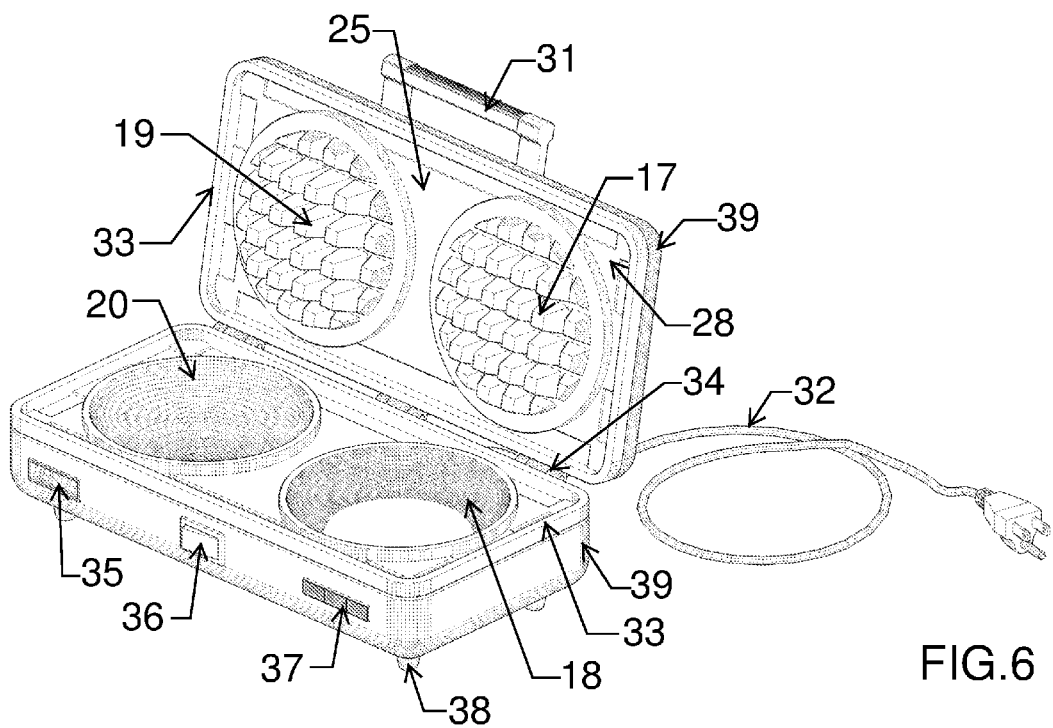
FIG. 6 is a top, front, right perspective view of another embodiment of the present invention with built in heating elements.
Figure 7:
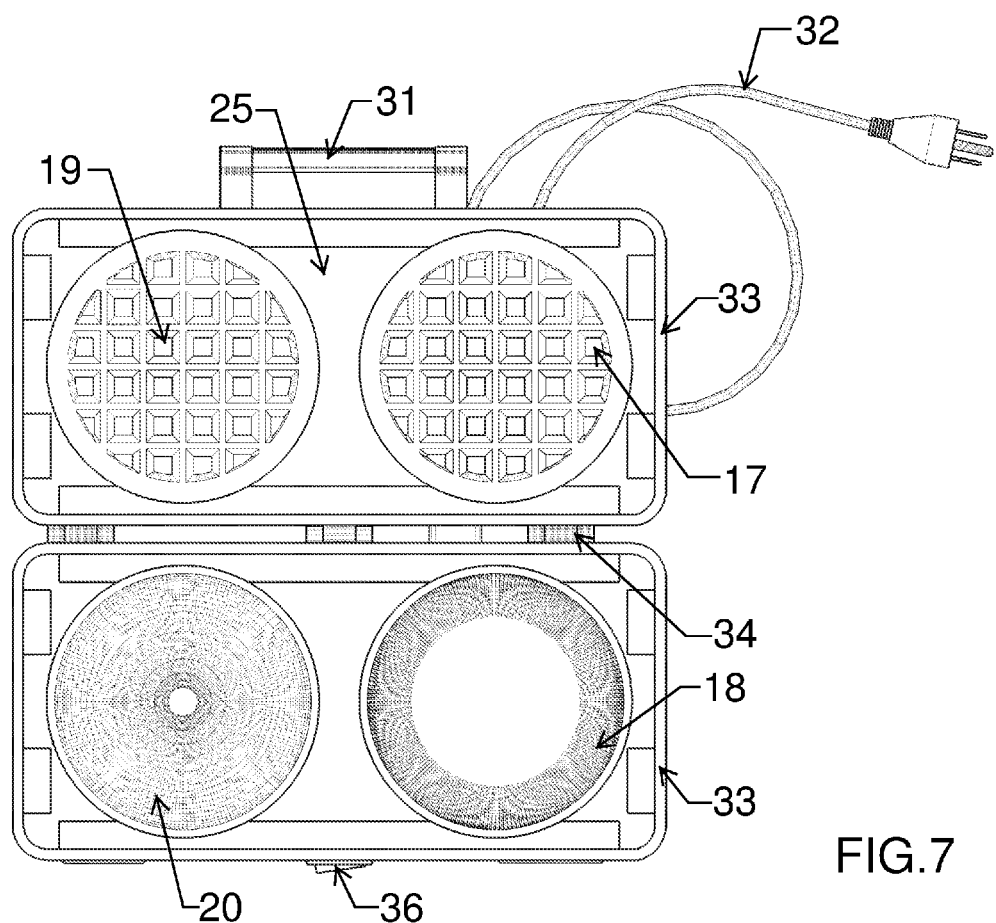
FIG. 7 is a top view of the embodiment of FIG. 6 shown in a fully open position.
Figure 8:
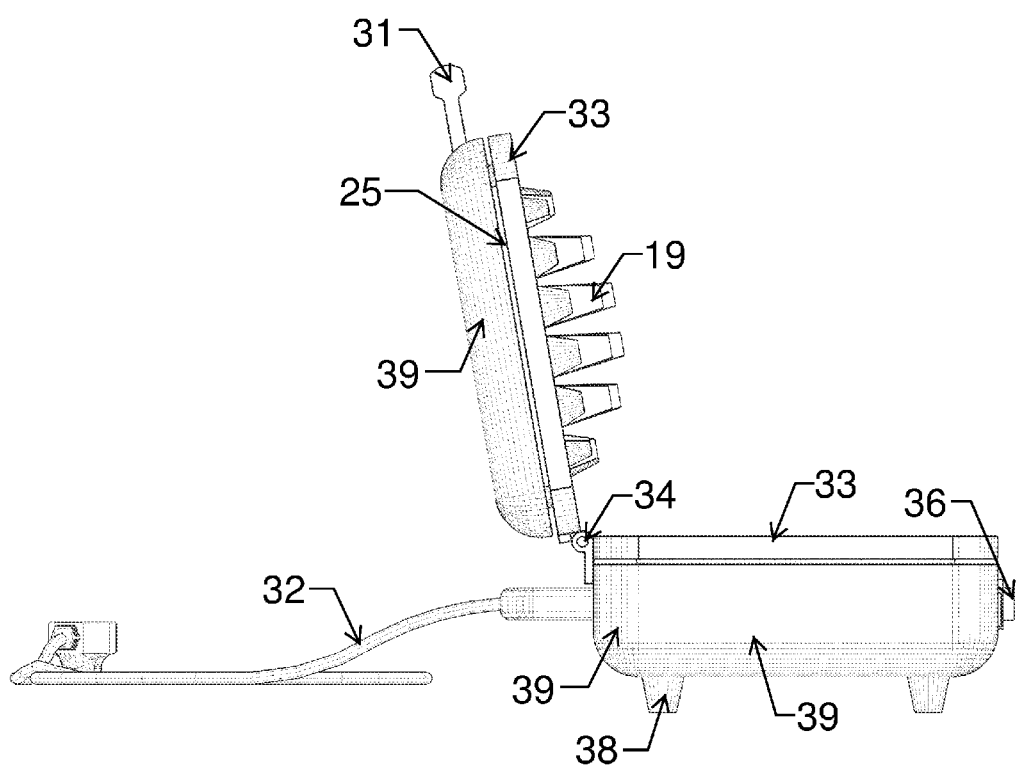
FIG. 8 is a left side view showing the profile of the embodiment of FIG. 6, showing the design of the protrusions and indentations that form the waffle shape of the resultant waffle bun product.
Figure 9:
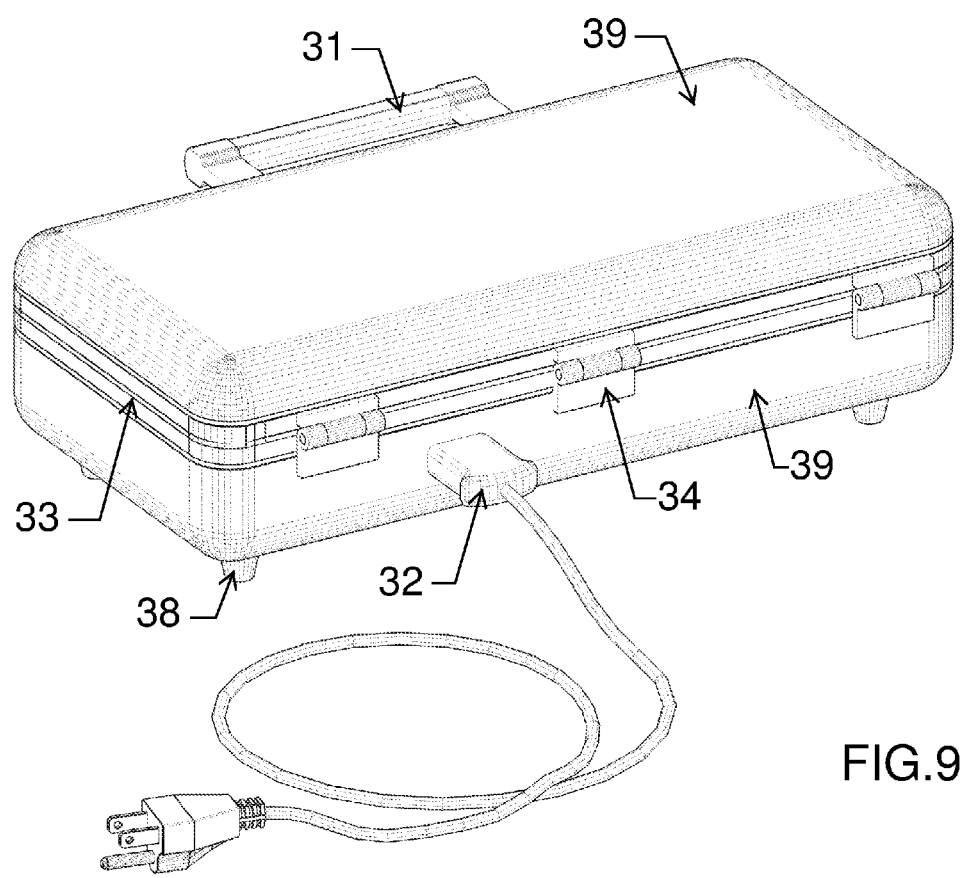
FIG. 9 is a top, back, right side perspective view of the embodiment of FIG. 6, in a closed position.

As shown in FIGS. 1-5, the waffle-iron cooking apparatus used for cooking and forming rounded bun shaped waffles is shown as a device with a top plate 26, and a bottom plate 27 that both encompass heat resistant handles 24. In one preferred embodiment, the top plate 26 and bottom plate 27 comprise a nonstick cookware coating to prevent batter from sticking to the apparatus. In some further embodiments, the nonstick cookware coating may be applied only to the top lid 25, variable length protrusions 17, 19, and bottom recesses 18, 20. When the device is set in the closed position as shown in FIGS. 4-5, the top bun shaped round recess 20 and the bottom bun shaped round recess 18 combined with the variable length protrusions for top bun shape 19 and the variable length protrusions for bottom bun shape 17, create a cavity that produces a rounded top bun waffle 40 and a rounded bottom bun waffle 41 when the appropriate amount of batter is poured into the waffle iron round recesses. The round recesses 18 and 20 and variable length protrusions 17 and 19 are designed as to allow even distribution of heat to the batter, which provides even cooking to the waffle. As used herein the term "rounded" refers to the convex outer shape of the bun forming a "dome like" structure. The rounded portion of the bun need not be completely round. For example, as shown in FIG. 5, the rounded bottom bun waffle 41 can be substantially flat at its bottommost portion. It is further contemplated that in some embodiments, the waffle iron 10 may comprise a bottom bun shaped recess 18 and variable length protrusions for bottom bun shape 17. A separate waffle iron comprises variable length protrusions for top bun shape 19 and a top bun shaped round recess 20. In other embodiments, as shown in the figures herein, waffle iron comprises both the bottom bun shaped recess 18 and variable length protrusions for bottom bun shape 17 and the variable length protrusions for top bun shape 19 and a top bun shaped round recess 20.

Alignment of the two halves of the apparatus is achieved through the link of the top lid hinge 30 and bottom plate hinge 29 and the alignment indentations 22. This alignment of the plates in the closed position creates a tight seal 42 using the lip edges 21 to seal off each cavity that produces the desired waffle product. Additional strength is achieved through the use of plate reinforcement ridges 28 which increase the plate thickness in key areas and a reinforced section for support of the heat resistant handles 24.

The apparatus described herein is used in a method for making bun shaped waffles. Referring to FIGS. 1-5, the apparatus is readied for use by pre-heating the top waffle iron plate 26 and bottom waffle iron plate 27 using a separate heat source such as a gas or electric stove burner until each element is at the sufficient temperature for whatever appropriate batter is to be used for the cooking operation. The top waffle iron plate 26 and bottom waffle iron plate 27 are then coupled together in an open position as shown in FIGS. 1 & 3 using the top plate hinge 30 and bottom plate hinge 29. Appropriate amounts of batter are poured into the top bun shaped round recess 20 and the bottom bun shaped round recess 18 and the top waffle iron plate 26 is closed over the bottom waffle iron-plate 27 using the heat resistant handles 24. The waffle-iron cooking apparatus is held on the heat source for approximately one minute to properly cook the first side at which point the waffle-iron cooking apparatus is flipped so that the top waffle iron plate 26 is resting on the heat source while maintaining a closed position as illustrated in FIGS. 4-5. The waffle-iron cooking apparatus is then opened using the heat resistant handles 24 at which point the two waffles are removed from the apparatus using an appropriate utensil such as a fork or tongs.

Figure 10:
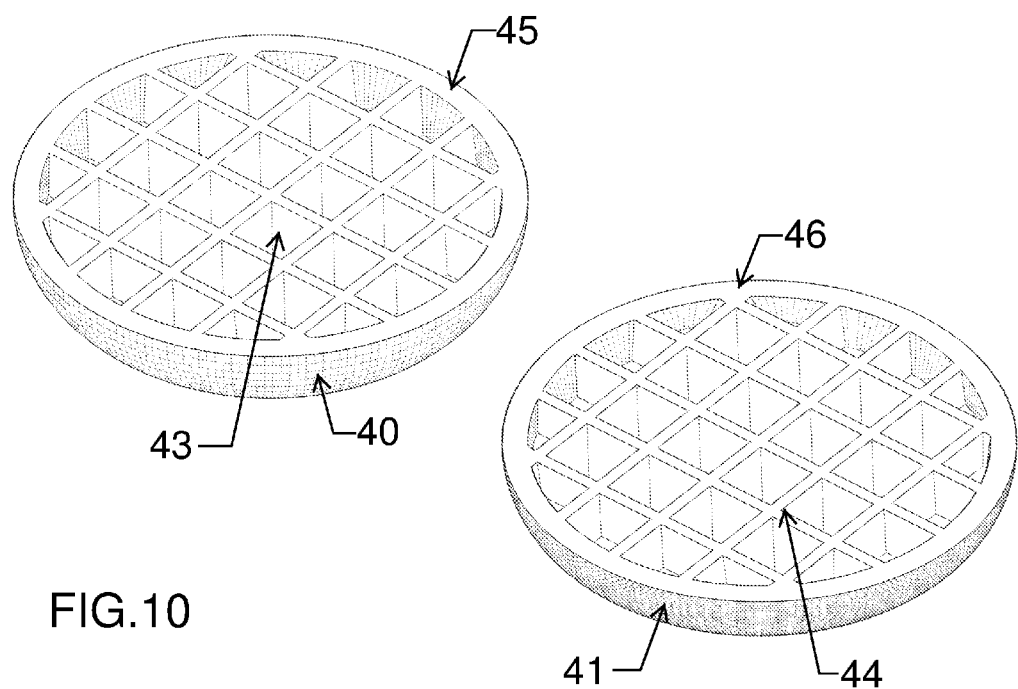
FIG. 10 is a bottom side perspective view of bun shaped waffles made using the embodiments of FIG. 1 or FIG. 6, showing the gridded waffle pattern.
Figure 11:
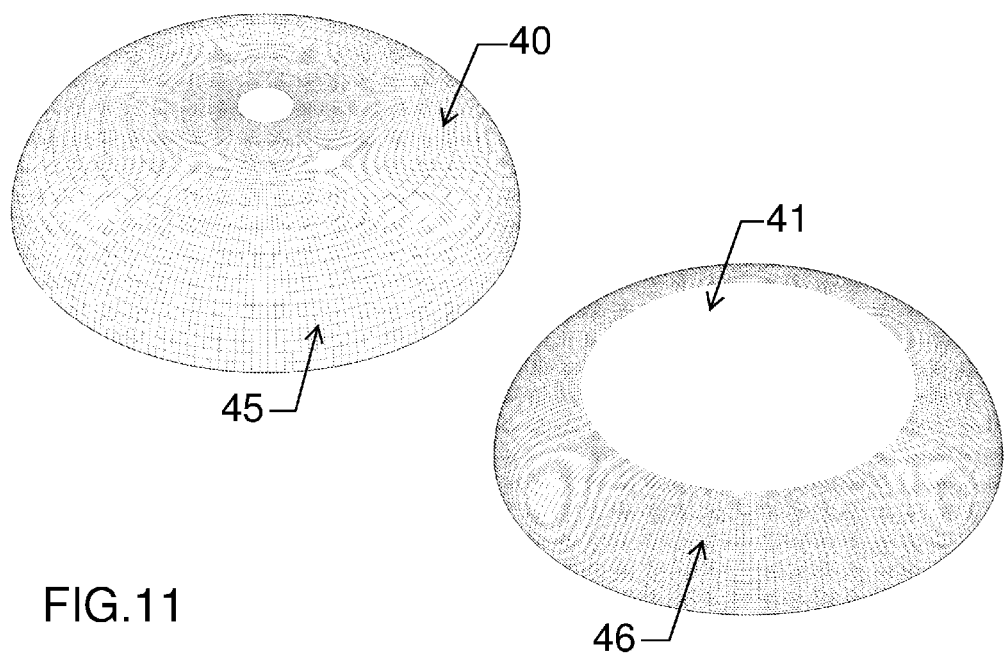
FIG. 11 is a top side perspective view of bun shaped waffles of FIG. 10, showing the unique round top bun and round bottom bun shapes.
Figure 12:
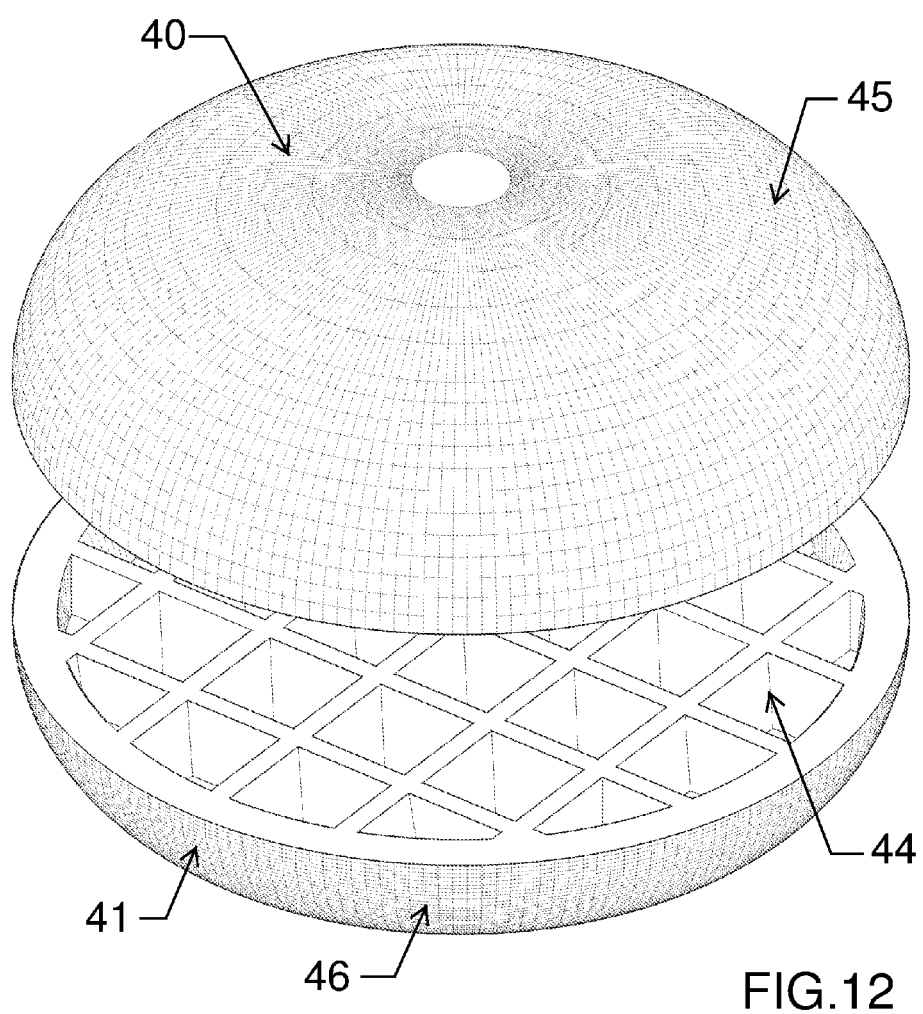
FIG. 12 is a top, bottom, side perspective view of bun shaped waffles of FIG. 10, as they would be arranged to form a sandwich suitable to eat.

FIGS. 6-9 illustrates an alternative embodiment of the invention that achieves the same waffle product illustrated in FIGS. 10-12. This alternative embodiment utilizes the top waffle iron plate 26 and bottom waffle iron plate 27 designs within a plug-in appliance with integrated heating elements as a heat source. The embodiment may include a nonstick surface coating for cooking. The alternative embodiment includes a cover 39 for both the bottom waffle iron plate 27 as well as the top waffle iron plate 26 with appropriate insulation and non-slip feet 38 to provide a stable base for the operation of the waffle iron. Durable hinges 34 connect the top plate 26 to the unit and provide smooth operation of the top lid 25 utilizing the cool to touch handle 31 to swing the unit open and closed during operation. The top waffle iron plate 26 and bottom waffle iron plate 27 are removable 33 for ease of cleaning separate from the appliance. In the operation of the appliance, a magnetic breakaway power cord 32 is used in case the appliance is knocked off or away from the power outlet. The appliance is turned on utilizing the power switch 36 and time is allowed for the integrated heating elements to heat up the top waffle iron plate 26 and bottom waffle iron plate 27 until such time as the ready programmable heat indicator 37 turns on and notifies that the appliance is ready. Appropriate amounts of batter are poured into the top bun shaped round recess 20 and the bottom bun shaped round recess 18 and the top lid 25 is closed using the cool to touch handle 31. Once the top lid 25 is closed, the programmable cooking timer 35 is automatically triggered and will notify when the appropriate time is achieved.

An alternative embodiment of the invention that achieves the same waffle product illustrated in FIGS. 10-12 within a plug-in appliance with integrated elements as a heat source utilizes individual rotating units so that each waffle cooks evenly on both sides and batter evenly fills the plate cavity. Each plate has a locking feature to maintain closure during rotation. Such alternative embodiment, not shown in the figures, comprises a pivot element on one end opposite the handle of the apparatus. The pivoting element allows the apparatus to be turned 180 degrees.

FIGS. 10-12 illustrates the waffle products cooked by the waffle-iron cooking apparatus which are a rounded top bun waffle 40 and a rounded bottom bun waffle 41 when utilized together form a complete sandwich bun. The opposite sides of the waffles feature top bun variable depth waffle indentations 43 and bottom bun variable depth waffle indentations 44 also illustrated in section in FIG. 5. This novel feature maintains the desired lightness and texture preferred in waffles and ensures even cooking throughout the waffle product despite its rounded shape.

Figure 13:
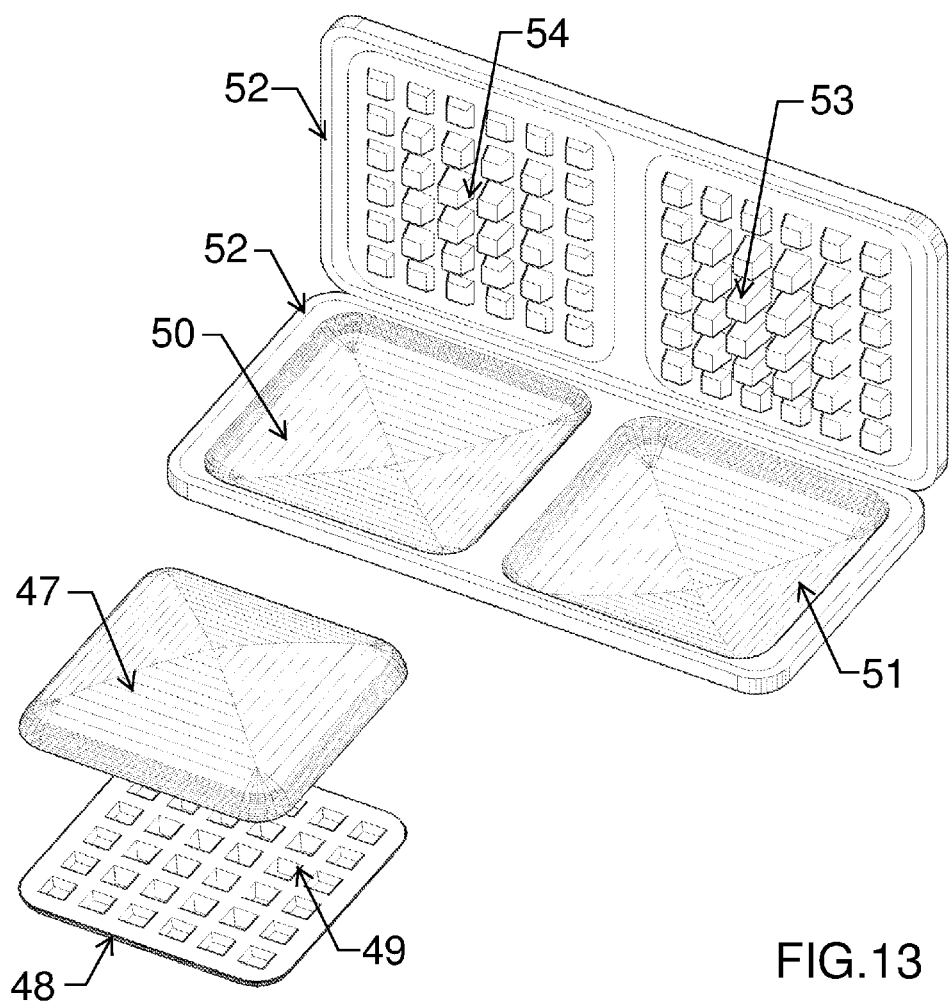
FIG. 13 is a top, front, right side perspective view of an embodiment of the present invention configured to make a square bun shaped waffle.

FIG. 13 illustrates an alternative embodiment of the invention such that the top waffle iron plate 26 and bottom waffle iron plate 27 achieves a variation of the waffle product illustrated in FIGS. 10-12. This variation of the waffle product is illustrated in FIG. 13 having a rounded top bun square waffle 47 and a rounded bottom square waffle 48. Used in the same manner as described for the preferred and alternative embodiments of the invention, the top waffle iron plate 26 features variable length protrusions for a square shaped top bun 53 and variable length protrusions for a square shaped bottom bun 54. The bottom waffle iron plate 27 features a rounded bottom bun square shaped recess 50 and a rounded top bun square shaped recess 51. When used following the same series of use and operation steps described above, the alternative embodiment of the invention achieves a waffle product which is a rounded top bun square waffle 47 and rounded bottom bun square waffle 48 with variable depth waffle indentations.

Figure 14:
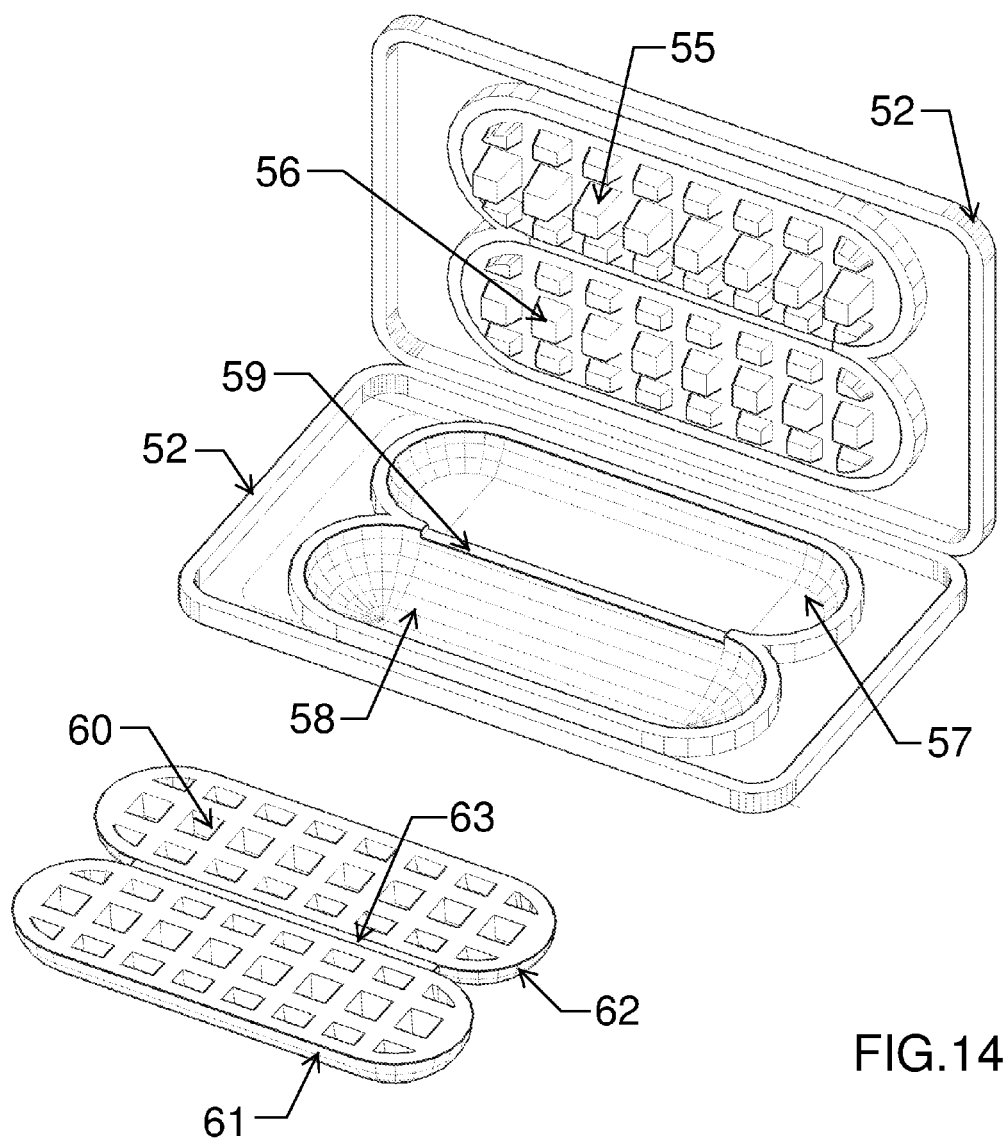
FIG. 14 is a top, front, right side perspective view of an embodiment of the present invention configured to make a hot dog bun shaped waffle.

FIG. 14 illustrates an alternative embodiment of the invention such that the top waffle iron plate 26 and bottom waffle iron plate 27 achieves a variation of the waffle product illustrated in FIGS. 10-12. This variation of the waffle product is illustrated in FIG. 14 having a rounded top hot dog bun waffle 61 and a rounded bottom hot dog bun waffle 62. Used in the same manner as described for the preferred and alternative embodiments of the invention, the top waffle iron plate 26 features variable length protrusions for a hot dog top bun 55 and variable length protrusions for a hotdog bottom bun 56. The bottom waffle iron plate 27 features a rounded bottom hot dog bun shaped recess 57, a rounded top hot dog bun shaped recess 58 and a bun connector recess 59. When used following the same series of use and operation steps described above, the alternative embodiment of the invention achieves a waffle product which is a rounded top hot dog bun waffle 61 and a rounded bottom hot dog bun waffle 62 connected by a bun connector 63 and with variable depth waffle indentations.

Figure 15:
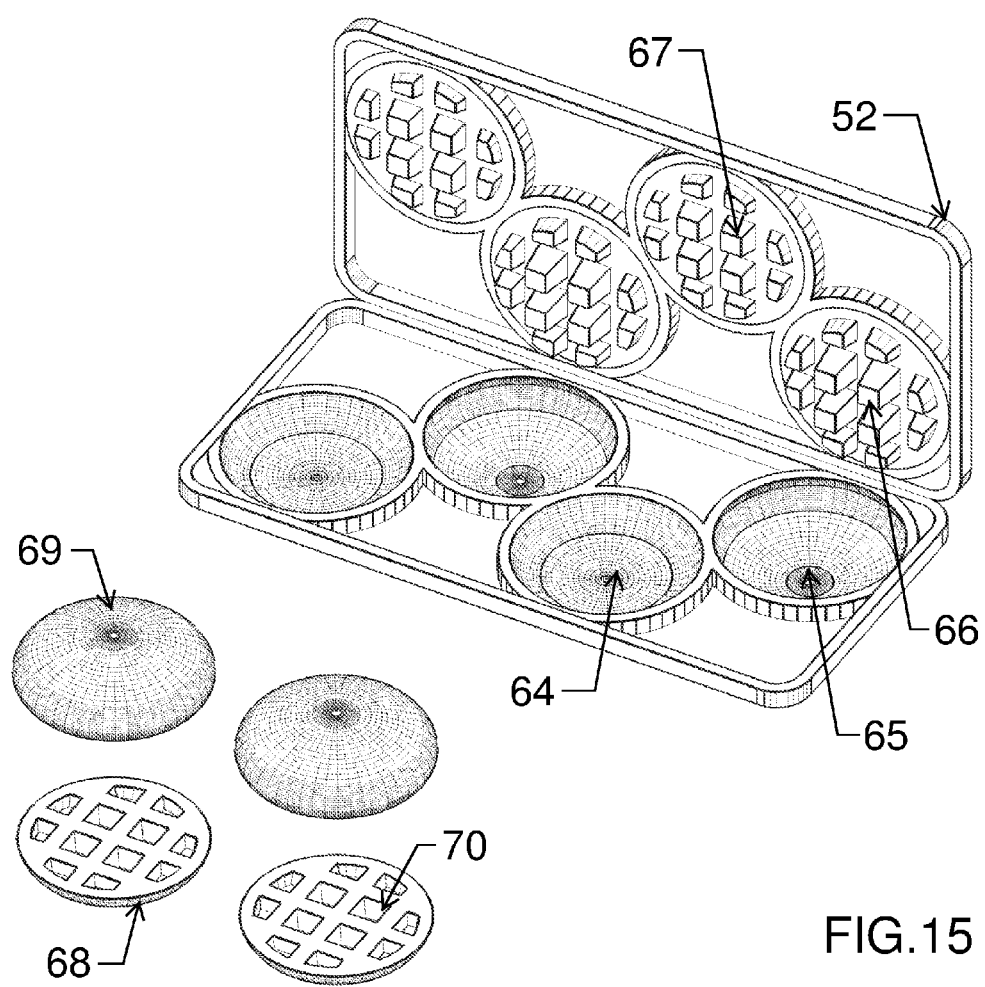
FIG. 15 is a top, front, right side perspective view of an embodiment of the present invention configured to make a slider burger bun shaped waffle.
Figure 16:
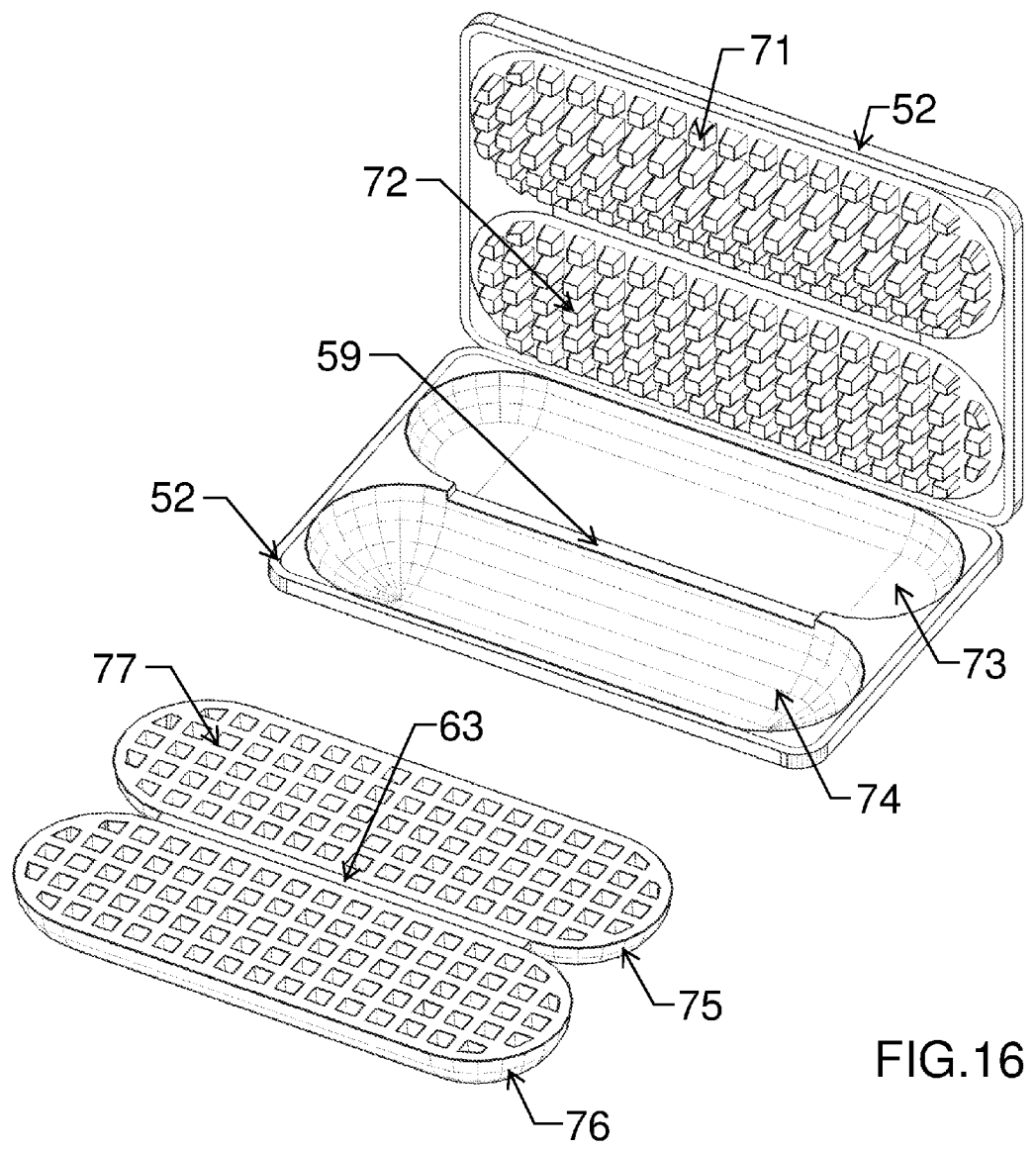
FIG. 16 is a top, front, right side perspective view of an embodiment of the present invention configured to make a submarine roll shaped waffle.

FIG. 15 illustrates an alternative embodiment of the invention such that the top waffle iron plate 26 and bottom waffle iron plate 27 achieves a variation of the waffle product illustrated in FIGS. 10-12. This variation of the waffle product is illustrated in FIG. 15 having a rounded top slider bun waffle 69 and a rounded bottom slider bun waffle 68. Used in the same manner as described for the preferred and alternative embodiments of the invention, the top waffle iron plate 26 features variable length protrusions for top slider buns 66 and variable length protrusions for bottom slider buns 67. The bottom waffle iron plate 27 features rounded bottom slider bun shaped recesses 64 and rounded top slider bun shaped recesses 65. When used following the same series of use and operation steps described above, the alternative embodiment of the invention achieves waffle products which are two rounded bottom slider bun waffles 68 and two rounded top slider bun waffles 69 with variable depth waffle indentations.

FIG. 14 illustrates an alternative embodiment of the invention such that the top waffle iron plate 26 and bottom waffle iron plate 27 achieves a variation of the waffle product illustrated in FIGS. 10-12. This variation of the waffle product is illustrated in FIG. 14 having a rounded hoagie roll bottom bun waffle 75 and a rounded hoagie roll top waffle 76. Used in the same manner as described for the preferred and alternative embodiments of the invention, the top waffle iron plate 26 features variable length protrusions for a hoagie roll top bun 71 and variable length protrusions for a hoagie roll bottom bun 72. The bottom waffle iron plate 27 features a rounded hoagie roll bottom bun shaped recess 73 and a rounded hoagie roll top bun shaped recess 74 and a bun connector recess 59. When used following the same series of use and operation steps described above, the alternative embodiment of the invention achieves a waffle product which is a rounded hoagie roll bottom bun waffle 75 and a rounded hoagie roll top bun waffle 76 connected by a bun connector 63 and with variable depth waffle indentations.

In various exemplary embodiments, the overall shape of the top lid 25, bottom plate 27 and waffle products vary depending on the intended use. In some embodiments, the shapes are oval, square, rectangle, and polygonal shapes including but not limited to hexagons, octagons, and decagons.

The waffle iron of some embodiments is designed to prepare one to four waffles. However, it is contemplated that waffle irons in accordance with some embodiments may be designed to produce larger numbers of waffles. In addition, the overall size and thickness that of the waffles may vary.

A method of producing waffles using the waffle iron described herein comprises various steps. In one preferred embodiment, as shown in FIGS. 1-5 the waffle iron is heated over an open flame or a radiant heating element. Waffle batter is then poured on the bottom plate. The top lid is closed over the bottom plate. The waffle is allowed to cook and, when ready, the top lid is raised and the waffle removed from the waffle iron.

In another preferred embodiment, the waffle iron of FIGS. 6-9 is used in a method of making waffles. In this alternative method, the waffle iron is plugged into an electrical outlet, which allows the heating elements on the top lid and bottom plate to heat up. Once hot, waffle mix is added to the bottom plate and the top lid is closed. After the waffles are ready, the top lid is opened and the waffle is removed from the apparatus. In one alternative embodiment, where a pivot element is included, after a determined period of time the waffle iron is rotated about the pivot element and the waffle is allowed to finish cooking. It is contemplated that various sources of heat may be utilized, such as open flame, electric heating elements, radiant heat, and electromagnetic induction.

A person of ordinary skill would recognize that various methods of applying the batter element to the device includes squeeze bottles, batter dispensers, batter cans, and pouring pitchers. Various types of batter for the purpose of making waffles can be used, including but not limited to sweet batters, savory batters, waffle batters and pancake batters, and batters with fillings including fruit, chocolate, and nuts. Various cooking times depending on apparatus configuration can be used depending on desired cooking temperature and desired product outcome.

The waffle products cooked by the waffle-iron cooking apparatus and its various alternative embodiments can be used in a limitless variety of sandwiches. Sandwiches that can be made using the waffle product include hamburgers and cheeseburgers, chicken sandwiches, fish sandwiches, hoagies and submarine sandwiches, hotdogs, sausages, Panini sandwiches, and sandwiches utilizing various sliced meats and cheeses. Traditionally, sandwiches utilize two pieces of bread with ingredients in between to form the complete sandwich. The rounded top bun waffle 40 and rounded bottom bun waffle 41 when utilized together form a complete sandwich bun replacing those breads typically used to make a sandwich. The rounded bottom bun waffle 41 would first be placed on a table surface where any toppings, condiments, proteins, and spreads would then be applied on top before completing the sandwich by placing the rounded top bun waffle 40 on top. In addition, alternative embodiments of the invention produce a top waffle and bottom waffle connected by a bun connector. This serves a purpose similar to hot dog buns and hoagie rolls currently available in the marketplace wherein any toppings, condiments, proteins, and spreads are placed in between the buns and the connected portion cradles the ingredients and holds them in place.

One embodiment relates to kits that include waffle iron, waffle mix and other elements. In some embodiments, various elements of the waffle making process including the waffle iron, operating instructions and warranty information are provided. Other embodiments also include waffle batter mixes, waffle recipe books, tools for removing waffles from the waffle iron, and tools for cleaning residue and batter from the waffle iron.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A waffle iron comprising:
a top plate and a bottom plate configured to close over one-another when said waffle iron is in a closed position, said top plate and said bottom plates each having an inner surface configured to face one-another when said waffle iron is in a closed position; the inner surface of said top plate having a plurality of protrusions extending in a direction perpendicular to a major plane of said top plate, wherein ends of said plurality of protrusions collectively form a convex profile, and the bottom plate having a recess having a concave profile configured to receive said plurality of projections when said waffle iron is in a closed position.

2. The waffle iron of claim 1, wherein the top plate comprises two regions having said plurality of protrusions, said two regions of protrusions each defining a convex profile and the bottom plate comprises two recesses, each having a concave profile configured to receive one of said regions of protrusions in said top plate.

3. The waffle iron of claim 1, said bottom plate recess having no protrusions.

4. The waffle iron of claim 1, said bottom plate recess having a generally smooth profile.

5. The waffle iron of claim 1, wherein comprising a top lid configured to receive said top plate and a base configured to receive said bottom plate.

6. The waffle iron of claim 5, wherein said top plate is configured for easy removal from said top lit for cleaning, and wherein said bottom plate is configured for easy removal from said base for cleaning.

7. The waffle iron of claim 2, wherein said two regions of projections and said two recesses have a circular cross-section.

8. The waffle iron of claim 2, wherein said two regions of projections and said two recesses have an elongated cross-section.

* * * * *